United States Patent
Yamashita et al.

(10) Patent No.: US 8,306,078 B2
(45) Date of Patent: Nov. 6, 2012

(54) REPETITION FREQUENCY CONTROL DEVICE

(75) Inventors: Tomoyu Yamashita, Miyagi (JP); Akiyoshi Irisawa, Miyagi (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 13/299,568

(22) Filed: Nov. 18, 2011

(65) Prior Publication Data

US 2012/0155500 A1 Jun. 21, 2012

(30) Foreign Application Priority Data

Dec. 21, 2010 (JP) .................................. 2010-284385

(51) Int. Cl.
*H01S 3/13* (2006.01)
(52) U.S. Cl. .................... 372/32; 372/29.02; 372/29.022
(58) Field of Classification Search ............... 372/29.02, 372/32
See application file for complete search history.

(56) References Cited

U.S. PATENT DOCUMENTS

| | | |
|---|---|---|
| 2002/0024689 A1 | 2/2002 | Shirane et al. |
| 2008/0165355 A1 | 7/2008 | Yasui et al. |

FOREIGN PATENT DOCUMENTS

| | | |
|---|---|---|
| JP | 8-029814 | 2/1996 |
| JP | 2000-151000 | 5/2000 |
| JP | 2001-194241 | 7/2001 |
| JP | 2003-224528 | 8/2003 |
| JP | 2006-245179 | 9/2006 |
| JP | 2009-016454 | 1/2009 |
| JP | 4565198 | 10/2010 |
| WO | 2006/092874 | 9/2006 |

*Primary Examiner* — Armando Rodriguez
(74) *Attorney, Agent, or Firm* — Greenblum & Bernstein, P.L.C.

(57) ABSTRACT

A repetition frequency control device includes a slave photoelectric conversion unit which converts a slave laser light pulse into a slave electrical signal, a master photoelectric conversion unit which converts a master laser light pulse into a master electrical signal, a frequency change unit which changes the repetition frequency of the master electric signal by a predetermined value, a phase comparator which detects a phase difference between the slave electric signal and the output from the frequency change unit, and a loop filter which removes a high frequency component of an output from the phase comparator, where the repetition frequency of the master laser does not undergo control based on one or both of the master electric signal and the slave electric signal.

3 Claims, 2 Drawing Sheets

REPETITION FREQUENCY CONTROL DEVICE

BACKGROUND ART

1. Technical Field of the Invention

The present invention relates to control of the repetition frequency of a laser light pulse.

2. Related Art

A system which maintains a difference between the repetition frequencies of two lasers to be constant by independently controlling the repetition frequencies of the two lasers has conventionally been known (refer to FIG. 18 and [0077] of a patent document 1 (Japanese Patent No. 4565198), for example).

SUMMARY OF THE INVENTION

However, the independently controlling the repetition frequencies of the two lasers increases complexity of a control system.

It is therefore an object of the present invention to cause the difference between the repetition frequencies of the two lasers to be constant without independently controlling the repetition frequencies of the two lasers.

According to the present invention, a repetition frequency control device includes: a slave laser that outputs a slave laser light pulse; a slave photoelectric conversion unit that receives the slave laser light pulse, and converts the slave laser light pulse into a slave electrical signal; a master laser that outputs a master laser light pulse; a master photoelectric conversion unit that receives the master laser light pulse, and converts the master laser light pulse into a master electrical signal; a frequency change unit that changes the repetition frequency of the master electric signal by a predetermined value; a phase difference detector that detects a phase difference between the slave electric signal and the output from the frequency change unit; and a loop filter that removes a high frequency component of an output from the phase difference detector, wherein: the repetition frequency of the master laser does not undergo control based on one or both of the master electric signal and the slave electric signal; and the repetition frequency of the slave laser light pulse changes according to an output from the loop filter.

According to the thus constructed repetition frequency control device, a slave laser outputs a slave laser light pulse. A slave photoelectric conversion unit receives the slave laser light pulse, and converts the slave laser light pulse into a slave electrical signal. A master laser outputs a master laser light pulse. A master photoelectric conversion unit receives the master laser light pulse, and converts the master laser light pulse into a master electrical signal. A frequency change unit changes the repetition frequency of the master electric signal by a predetermined value. A phase difference detector detects a phase difference between the slave electric signal and the output from the frequency change unit. A loop filter removes a high frequency component of an output from the phase difference detector. The repetition frequency of the master laser does not undergo control based on one or both of the master electric signal and the slave electric signal. The repetition frequency of the slave laser light pulse changes according to an output from the loop filter.

According to the repetition frequency control device of the present invention, the resonator length of the slave laser may change according to the output from the loop filter.

According to the repetition frequency control device of the present invention, the slave laser may include a piezo element; the output from the loop filter may be fed to the piezo element; and the resonator length of the slave laser may be changed by extension and contraction of the piezo element.

PREFERRED EMBODIMENTS

A description will now be given of an embodiment of the present invention referring to drawings.

Figure 1:
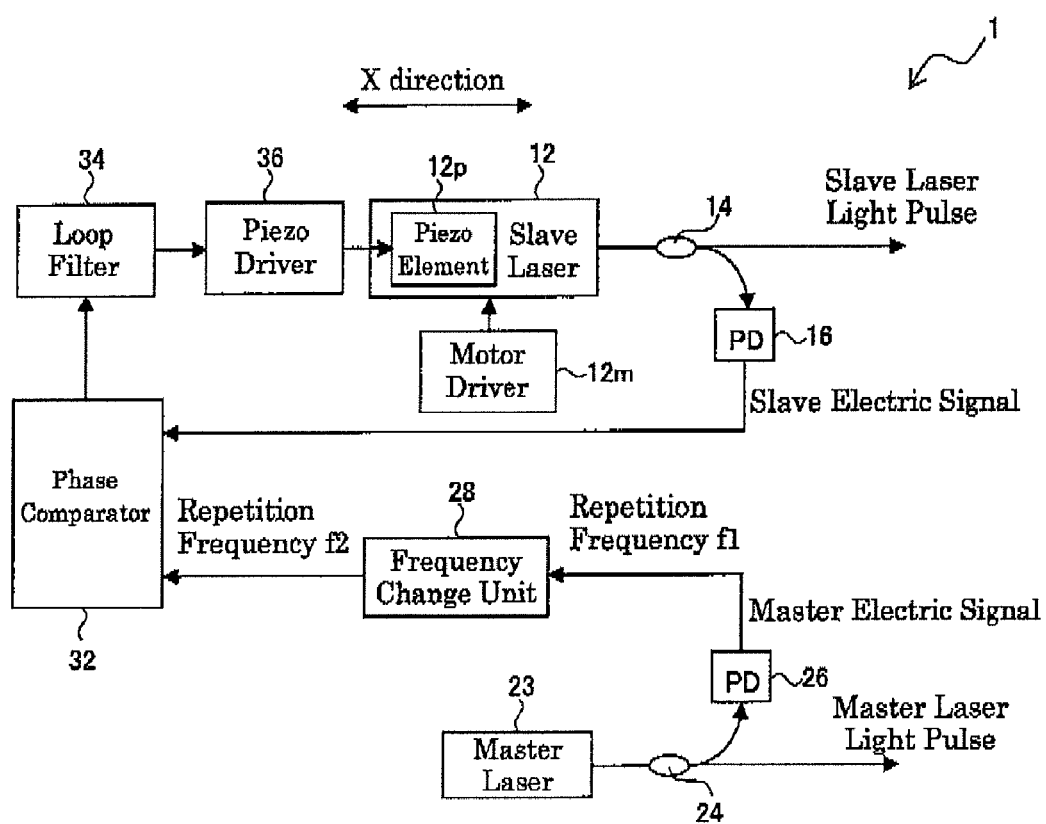
FIG. 1 is a functional block diagram showing a configuration of a repetition frequency control device 1 according to the embodiment of the present invention.

FIG. 1 is a functional block diagram showing a configuration of a repetition frequency control device 1 according to the embodiment of the present invention.

The repetition frequency control device 1 according to the embodiment of the present invention includes a slave laser 12, a motor driver 12m, a slave optical coupler 14, a photodiode (slave photoelectric conversion unit) 16, a master laser 23, a master optical coupler 24, a photodiode (master photoelectric conversion unit) 26, a frequency change unit 28, a phase comparator (phase difference detector) 32, a loop filter 34, and a piezo driver 36.

The slave laser 12 outputs a laser light pulse (referred to as "slave laser light pulse"). It should be noted that the repetition frequency of the slave laser light pulse is approximately 50 MHz, for example.

The slave laser 12 includes a piezo element 12p. The piezo element 12p extends and contracts in an X direction (horizontal direction in FIG. 1) as a result of impression of a voltage of an output from the loop filter 34 after amplification by the piezo driver 36. The extension/contraction in the X direction of the piezo element 12p changes the laser resonator length of the slave laser 12. The change of the laser resonator length changes the repetition frequency of the slave laser light pulse.

The motor driver 12m coarsely adjusts the laser resonator length of the slave laser 12 by driving a stepping motor (not shown) in the slave laser 12. After the adjustment by the motor driver 12m has been finished, the piezo element 12p carries out fine adjustment.

The slave optical coupler 14 receives the slave laser light pulse output from the slave laser 12, and outputs the slave laser light pulse to the photodiode 16 and the outside at a ratio of 1:9 in power, for example. The optical power of the slave laser light pulse fed to the photodiode 16 is thus 10% of the optical power of the slave laser light pulse output from the slave laser 12, for example.

The photodiode (slave photoelectric conversion unit) 16 receives the slave laser light pulse from the slave optical coupler 14, and converts the slave laser light pulse into an electric signal (referred to as "slave electric signal").

The master laser 23 outputs a laser light pulse (referred to as "master laser light pulse"). It should be noted that the repetition frequency f1 of the master laser light pulse is approximately 50 MHz, for example.

Moreover, the repetition frequency f1 of the master laser 23 is adjusted to approximately 50 MHz in advance before the use of the repetition frequency control device 1 starts. For example, an output of an OCXO (oven-controlled crystal oscillator) (not shown) oscillating at 100 MHz divided by half and the output of the master laser 23 are compared with each other by a phase comparator (not shown), and the repetition frequency of the output of the master laser 23 is adjusted so that the repetition frequencies of both of them are approximately the same (different by approximately 10 Hz). The adjustment of the repetition frequency of the output from the master laser 23 is achieved by driving the stepping motor (not shown) in the master laser 23, thereby adjusting the laser oscillator length of the master laser 23.

The adjustment of the repetition frequency f1 of the master laser 23 is carried out for some seconds at an interval of some tens of minutes when the repetition frequency control device 1 is not used.

The master optical coupler 24 receives the master laser light pulse output from the master laser 23, and outputs the master laser light pulse to the photodiode 24 and the outside at a ratio of 1:9 in power, for example. The optical power of the master laser light pulse fed to the photodiode 24 is thus 10% of the optical power of the master laser light pulse output from the master laser 23, for example.

The photodiode (master photoelectric conversion unit) 26 receives the master laser light pulse from the master optical coupler 24, and converts the master laser light pulse into an electric signal (referred to as "master electric signal").

The frequency change unit 28 changes the repetition frequency f1 of the master electric signal by a predetermined value Δ (10-20 Hz, for example). The frequency change unit 28 changes the repetition frequency f1 of the master electric signal to f2=f1−Δ, for example.

Figure 2:
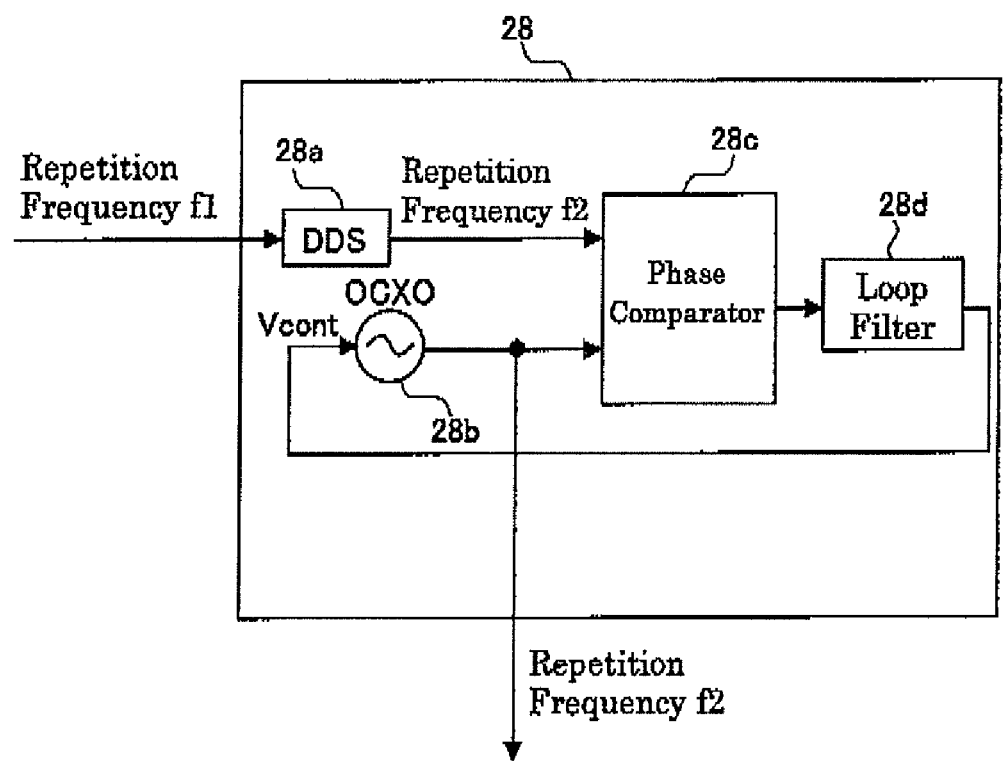
FIG. 2 is a functional block diagram showing a configuration of the frequency change unit 28.

FIG. 2 is a functional block diagram showing a configuration of the frequency change unit 28. The frequency change unit 28 includes a DDS 28a, an OCXO 28b, a phase comparator 28c, and a loop filter 28d.

The DDS (Direct Digital Synthesizer) 28a receives the master electric signal (repetition frequency f1), and outputs the master electric signal (repetition frequency f2). The OCXO 28b is an oven-controlled crystal oscillator, and the oscillation frequency thereof is approximately 50 MHz. The phase comparator 28c compares the output from the DDS 28a and the output from the OCXO 28b in phase, and detects and outputs a phase difference therebetween. The loop filter 28d removes a high frequency component of the output from the phase comparator 28c. A term "remove" does not necessarily imply complete removal only, and a case in which the high frequency component is slightly left is also included in "remove". In the following section, "remove" has the same meaning.

It should be noted that the OCXO 28b receives an output (Vcont) from the loop filter 28d, and changes the oscillation frequency according to Vcont. It should be noted that the OCXO 28b changes the oscillation frequency so that the phase difference output from the phase comparator 28c is a constant value (such as 0 degree, 90 degrees, or −90 degrees).

As a result, the master electric signal (repetition frequency f2) is obtained from the OCXO 28b as the output of the frequency change unit 28.

The phase comparator (phase difference detector) 32 compares the slave electric signal and the output from the frequency change unit 28 (master electric signal, repetition frequency f2) with each other in phase, and detects and outputs the phase difference therebetween.

The loop filter 34 removes a high frequency component of the output from the phase comparator 32.

The piezo driver 36 is a power amplifier, for example, and amplifies the output from the loop filter 34. The output from the piezo driver 36 is fed to the piezo element 12p. As a result, the piezo element 12p expands/contracts in the X direction. It should be noted that the piezo element 12p is expanded/contracted so that the phase difference detected by the phase comparator 32 is a constant value (such as 0 degree, 90 degrees, or −90 degrees). As a result, the repetition frequency of the slave laser light pulse can be precisely adjusted to the repetition frequency f2 (=f1−Δ).

It should be noted that the repetition frequency f1 of the master laser does not undergo control based on one or both of the master electric signal and the slave electric signal. In other words, the master laser 23 is in a free run state. As a result, the repetition frequency f1 of the master laser usually presents a frequency fluctuation of some tens of Hz for ten minutes. This is in contrast to the fact that the repetition frequency of the slave laser 12 undergoes the control based on the master electric signal and the slave electric signal.

A description will now be given of an operation of the embodiment of the present invention.

First, before the use of the repetition frequency control device 1 starts, the repetition frequency f1 of the master laser 23 is adjusted to approximately 50 MHz in advance. On this occasion, the repetition frequency of the slave laser 12 does not undergo the control based on one or both of the master electric signal and the slave electric signal. In other words, the slave laser 12 is in a free run state.

The use of the repetition frequency control device 1 then starts.

A part of the slave laser light pulse output from the slave laser 12 is led by the slave optical coupler 14 to the photo diode 16, undergoes the photoelectric conversion, becomes the slave electric signal, and is fed to the phase comparator 32.

A part of the master laser light pulse (repetition frequency f1) output from the master laser 23 is led by the master optical coupler 24 to the photodiode 26, undergoes the photoelectric conversion, and becomes the master electric signal. The repetition frequency of the master electric signal is changed from f1 to f2=f1−Δ by the frequency change unit 28, and the master electric signal is then fed to the phase comparator 32.

The phase comparator 32 compares the phase of the slave electric signal and the phase of the output (master electric signal, repetition frequency f2) from the frequency change unit 28 with each other, and detects and outputs the phase difference therebetween. The high frequency component is removed from the output from the phase comparator 32 by the loop filter 34, and the resulting output is amplified by the piezo driver 36, and is fed to the piezo element 12p. The piezo element 12p contracts/extends so that the phase difference detected by the phase comparator 32 has a constant value (0 degree, 90 degrees, or −90 degrees, for example). As a result, the repetition frequency of the slave laser light pulse can be precisely adjusted to the repetition frequency f2 (=f1−Δ).

According to the embodiment of the present invention, by, instead of independently controlling the repetition frequencies of the two lasers (the master laser 23 and the slave laser 12), controlling the repetition frequency of the slave laser 12, the difference in repetition frequency between two lasers can be constant (predetermined value Δ).

It should be noted that the master laser light pulse (repetition frequency f1) and the slave laser light pulse (repetition frequency f2 (=f1−Δ)) can be used in a measurement device using THz light.

For example, the master laser light pulse is fed to a THz light generator (such as a photoconductive switch) thereby generating THz light, and irradiates the THz light on a device under test. The THz light which has transmitted through the device under test or has been reflected by the device under test is fed to a THz light detector (such as a photoconductive switch). On this occasion, the THz light can be detected by feeding the slave laser light pulse to THz light detector.

The invention claimed is:

1. A repetition frequency control device comprising:
a slave laser that outputs a slave laser light pulse;
a slave photoelectric conversion unit that receives the slave laser light pulse, and converts the slave laser light pulse into a slave electrical signal;
a master laser that outputs a master laser light pulse;
a master photoelectric conversion unit that receives the master laser light pulse, and converts the master laser light pulse into a master electrical signal;
a frequency change unit that changes the repetition frequency of the master electric signal by a predetermined value;
a phase difference detector that detects a phase difference between the slave electric signal and the output from the frequency change unit; and
a loop filter that removes a high frequency component of an output from the phase difference detector, wherein:
the repetition frequency of the master laser does not undergo control based on one or both of the master electric signal and the slave electric signal; and
the repetition frequency of the slave laser light pulse changes according to an output from the loop filter.

2. The repetition frequency control device according to claim 1, wherein the resonator length of the slave laser changes according to the output from the loop filter.

3. The repetition frequency control device according to claim 2, wherein;
the slave laser comprises a piezo element;
the output from the loop filter is fed to the piezo element; and
the resonator length of the slave laser is changed by extension and contraction of the piezo element.

* * * * *